F. W. HALL.
COIN COLLECTING MEANS FOR TELEPHONE SERVICES.
APPLICATION FILED JULY 8, 1919.

1,364,550.

Patented Jan. 4, 1921.
3 SHEETS—SHEET 1.

Inventor:
Frederick William Hall.
by his Attorney:

F. W. HALL.
COIN COLLECTING MEANS FOR TELEPHONE SERVICES.
APPLICATION FILED JULY 8, 1919.
1,364,550.
Patented Jan. 4, 1921.
3 SHEETS—SHEET 2.
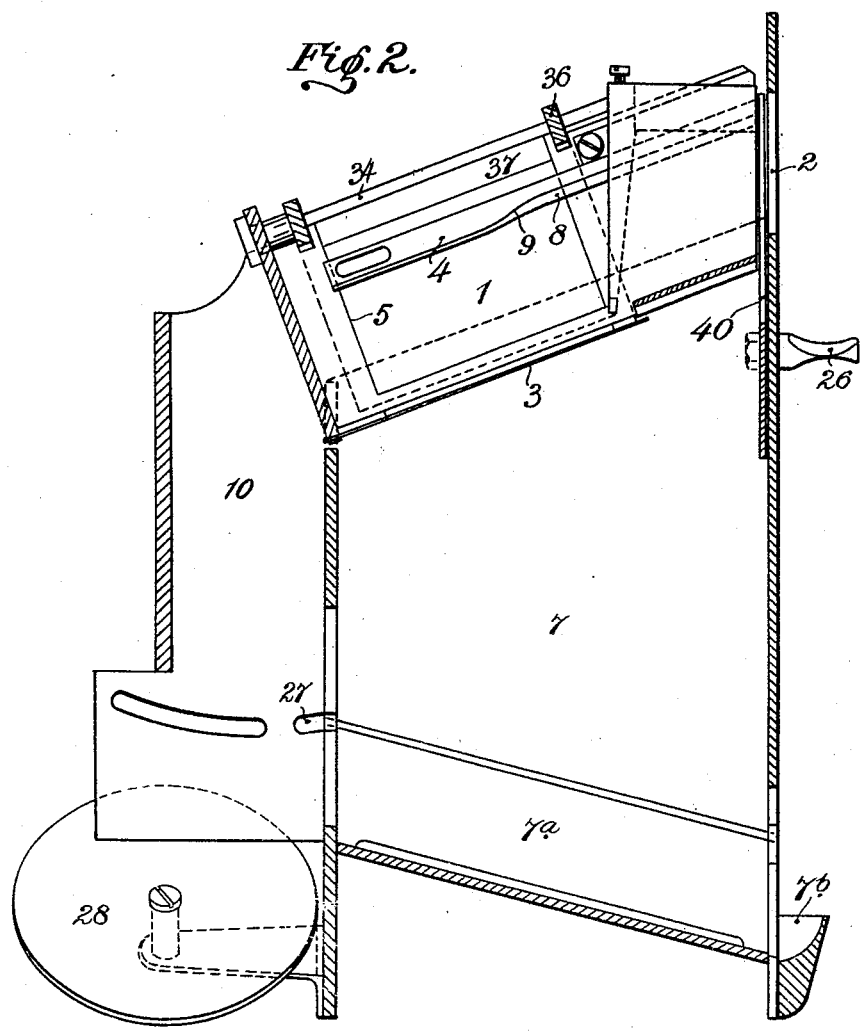
Inventor:
Frederick William Hall.
by his Attorney:

F. W. HALL.
COIN COLLECTING MEANS FOR TELEPHONE SERVICES.
APPLICATION FILED JULY 8, 1919.
1,364,550.
Patented Jan. 4, 1921.
3 SHEETS—SHEET 3.
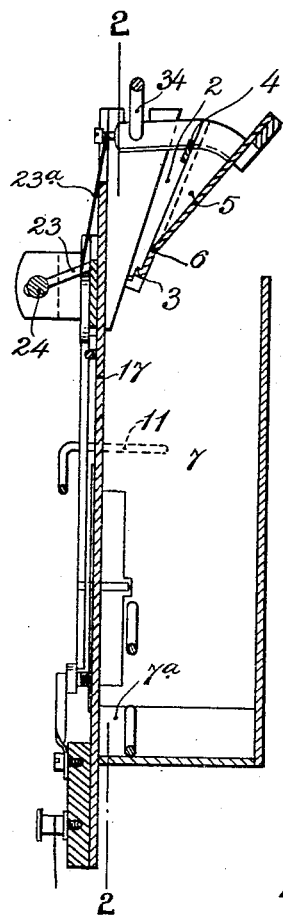
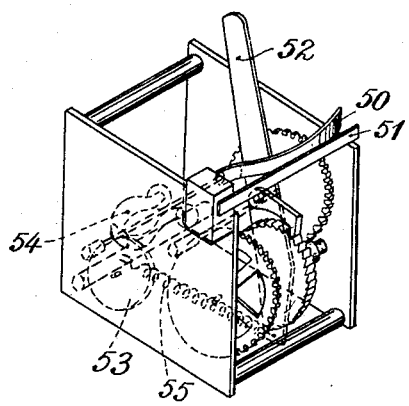
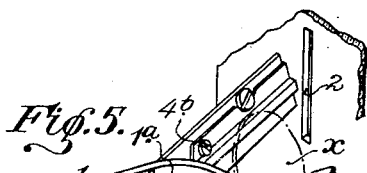
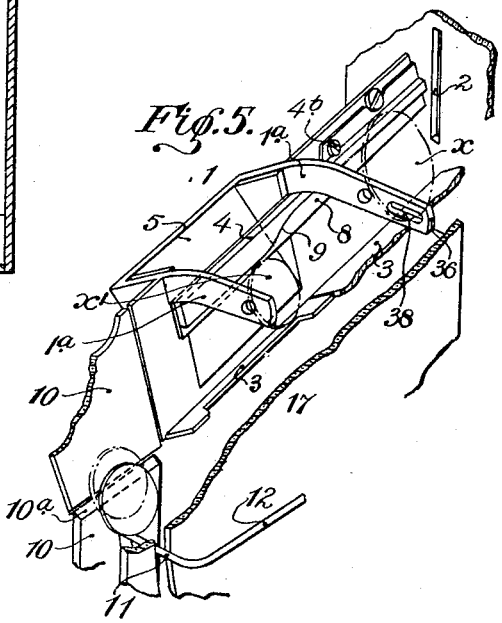
Inventor:
Frederick William Hall.
by his Attorney:

UNITED STATES PATENT OFFICE.

FREDERICK WILLIAM HALL, OF LONDON, ENGLAND.

COIN-COLLECTING MEANS FOR TELEPHONE SERVICES.

1,364,550.  Specification of Letters Patent.  Patented Jan. 4, 1921.

Application filed July 8, 1919. Serial No. 309,526.

*To all whom it may concern:*

Be it known that I, FREDERICK WILLIAM HALL, a subject of the King of England, and a resident of London, England, engineer, have invented a certain new and useful Improved Coin-Collecting Means for Telephone Services, of which the following is a specification.

This invention relates to coin collecting means for telephone services which will only permit communications between users after correct payment has been deposited in the box, and in which means are provided under the control of the caller by which the money can either be deposited into the cash receptacle and a signal given, or returned to the caller in the event of the line being engaged or out of order.

The invention involves the use of a balance for the coins inserted and a rocking member coöperating therewith to receive the coins from the balance and under the control of the caller whereby it may be rocked in one or other direction to deliver the coins either to the cash receptacle or to be returned to the caller.

A feature of the present invention is to provide means coöperating with the balance and rocker whereby both the calling and the speaking circuits are closed by the insertion of the coin or coins into the machine, the calling circuit being broken on return of the balance to normal and the speaking circuit broken by operating a returned money device.

The invention also comprises a number of other features in connection with the closing and opening of the calling and speaking circuits and details of construction and combinations of parts as hereinafter fully described and specifically pointed out in appended claims with reference to the accompanying drawings, wherein:—

Fig. 2 is a sectional view after removal of the face plate shown in Fig. 1 and the parts in front thereof, and illustrating more particularly the coin chutes.

Fig. 3 is a cross section on line 3—3 of Fig. 1.

Fig. 4 illustrates in perspective a time switch forming a modification or addition to the parts shown in Fig. 1.

Fig. 5 is a detail view of the chute and appurtenant parts on an enlarged scale.

Figure 1:
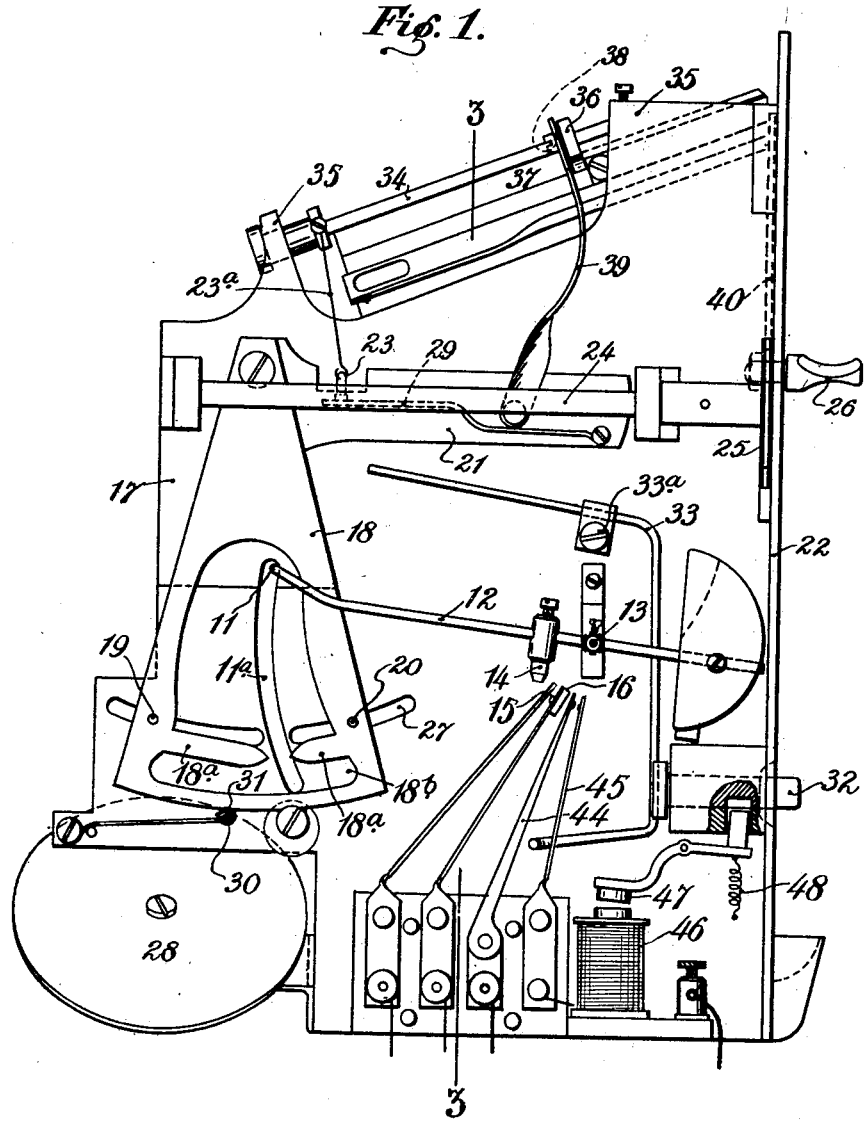
Figure 1 is a side elevation of the mechanism within the call box showing the same in its position of rest.

In the invention as illustrated an angularly disposed coin chute 1 is placed behind a coin-entering slot 2. The chute is formed with a fixed rail 3 along one edge, such as the lower, and a movable rail 4 pivoted at $4^b$ along the opposite edge, such as the upper edge. A section 5 of the chute is recessed or off-set behind the rails 3, 4, and so formed that, should a coin be unsupported by the upper rail 4, it will fall and rock about a fulcrum 6 formed in the recessed section 5, in such a way that its lower edge will be carried clear from the lower rail 3 and it will fall into a chamber 7 to be returned to the caller by means of the chute $7^a$ and a cup $7^b$ outside the casing, or otherwise dealt with as desired. The face of the upper rail 4 is recessed as at 8, said recess ending in a shoulder 9 so placed that certain coins such as pennies will pass along the whole face of the rail unimpeded as at $x$, Fig. 5, while others of smaller size such as florins will run in the recess 8 and will strike the abutment 9 and by so doing lift the rail about its pivot $4^b$, thereby causing it to cease supporting the coin, whereupon the coin will fall into the recessed portion 5 and thence to chamber 7. Other coins, such as halfpennies, will run along the lower edge of the rail unimpeded, as at $x^1$, while still other coins of yet smaller size, such as six-pences, will fall below the rail 4 and also be rejected by falling as described.

The machine may thus be capable of operation by coins of different denominations, such as pennies and half-pennies the former running along and being supported by the face of rail 4 and the halfpennies running along and being supported by the rail portion 8 without contacting with the abutment 9. Coins of a diameter between pennies and halfpennies will, however, engage abutment 9 and throw up the rail, while coins of smaller diameter than a halfpenny will not be supported at all and fall straightway into chamber 7.

Coins passing the tests imposed by the mechanism just described are conducted to a vertical chute 10 where they are deposited on the bent end 11 of the counterpoised balance arm 12 pivoted at 13 and when the correct number of coins has been so deposited (in the event of more than one coin being required to render the apparatus operative) this arm 12 is swung down by the weight of the coin or coins and makes an electrical connection by the stud 14 pressing the leaf-spring 15 against the leaf-spring 16.

The inner wall of the vertical chute 10 where it joins the inclined chute 1 may be stepped slightly with relation to the end of said inclined chute as at 10ª above the balance 12 and the coin when on the balance is slightly above the lower rail 3 of chute 1 so that each successive coin to the number necessary to depress the balance 12 arrives at the side of or behind the previous coin and not on top thereof as indicated in Fig. 5.

Pivoted to the plate 17 which forms one side of the vertical chute 10 is a member, which may be in the form of a quadrant 18 provided with two pins or other form of abutment 19, 20, which are so placed that when the balance arm descends under the action of the coins, the latter come to rest between said pins or abutments.

The bent end 11 above mentioned passes through and is guided by a slot 11ª in the plate 17. The coin as it depresses said bent end cannot be discharged into the cash receptacle by the pin 20 on the quadrant until said balance arm is fully depressed and has passed the fingers 18ª on the quadrant and come into the slotted portion 18ᵇ thereof for the reason that until this position is reached the coin will be prevented from being discharged from the chute 10 by the pin 20 owing to it being obstructed by the outer wall of the chute (Fig. 2). Discharge of the coin into the chamber 7 and along the returned money chute 7ª to the cup 7ᵇ may be permitted before the aforesaid position is reached.

The quadrant member 18 is provided with an extended projection or lever 21, which can be passed through the front plate 22 or other part of the apparatus to a position under the control of the caller, but preferably as illustrated, it is adapted to be operated by an arm 23 on a rock shaft 24 having also an arm 25 carrying a handle 26 projecting through a slot in the front plate. The said quadrant 18 and its lever are kept in a central position by means such as a counterpoise as hereinafter described. The caller by depressing the handle 26 will cause the quadrant to rock to the left of the position shown in Fig. 1 whereupon the pin 20 projecting from the quadrant through the slot 27, acting on the coin or coins will cause it or them to enter or fall into the cash receptacle.

The coins in passing to the cash receptacle fall on a sounder 28 which being audible at the exchange gives the signal that they have passed in this direction.

It will be seen that the arm 23 in the course of its movement first arrives against a spring 29, which is attached to the lever 21 and that after it has brought this spring into tension, it arrives against and moves the lever 21. To insure a complete movement of the quadrant 18 taking place the quadrant is retained in its central position as by a spring catch 30 engaging a rounded recess 31 in the quadrant. The tension given to the spring arm 29 causes the quadrant when forced out of engagement with the spring catch 30 to make a complete movement.

In order to move the quadrant 18 in the other direction from the normal in order to return the deposited coins to the caller instead of passing them to the cash receptacle as above described, a push button 32 may be operated by the caller to rock a lever 33 which abuts against and raises the lever arm 21 of the quadrant. The lever 33 is pivoted at 33ª and is formed of spring wire so as to be resilient in order that the quadrant may be given a complete stroke by the tension of the lever when the quadrant has freed itself from the spring catch 30.

The chute 1 may be used as a counterpoise to return the quadrant 18 to its central position from one direction of movement and the quadrant itself by being weighted by its lever arm 21 will similarly return from the other direction. In the event of so using the chute 1 as a counterpoise, arms 1ª of the chute are carried by a rock-shaft 34 mounted in lugs 35, 35, on the frame. The upper chute arm 1ª carries an extension 36 connected by pin 37 and slot 38 to a link 39 connected to lever arm 21 of the quadrant 18. The slot 38 permits of free movement of the lever arm 21 when the quadrant is moved in the contrary direction to return the coins to the caller.

I may also provide a link 23ª between the lower arm 1ª of the chute and the arm 23 on the rock-shaft 24 so that when the latter is rocked by the handle 26 as above described, the chute is also rocked with the rock-shaft 34, the load of the chute being thus upon the shaft 24 and arm 23 thereby relieving the arm 21 of said load and allowing the quadrant freedom of initial movement; said quadrant is, however, returned to central position by the weight of the chute and arm 21 as described.

The rocking movement given to the chute serves to clear it of any dirt that may have fallen into it. A projecting sweeper 40 connected to the arm 25 of the operating handle 26 also serves to lock the handle 26 against movement should a coin be inserted attached to a wire, or any other obstruction be present in the coin slot.

In the operation of the mechanism described, the money is first placed in the slot, either 1d, 1½d, 2d, 2½d, etc. as may be decided upon. When the correct number of coins have been so deposited, the balance arm will rock and give an electrical signal as hereinafter described to the telephone exchange that a caller is on the line. Should the subscriber's number demanded be free, then a movement given to a handle 26 ejects the money over the sounder 28 into the cash receptacle, indicating to the exchange that the call has been paid for.

On the other hand, if the number asked for is engaged, or if the caller gets no response from the exchange on account of the line or telephone instrument being out of order, then by pushing the button 32, the money is returned to the caller.

From the above description it will be seen that instead of using two levers with their respective handle and button to produce the two different operations mentioned, if the lever 21 connected to the quadrant 18 be extended through the front plate 22, then movement thereof in one direction will produce one effect, and a movement in the other direction will produce the other effect.

The call is given to the exchange as follows:—

15 and 16 are two spring blades normally separated. On the balance is a stud 14 which when the balance is depressed by the weight of the coins thereon abuts on the blade 15 and brings it into contact with blade 16, thus completing the calling circuit.

A further object of the present invention is to provide means of particular service with such a mechanism for setting up the speaking connection and severing it in the event of the money being returned to the caller so as to prevent this severing action during a conversation, and these objects are effected by controlling said lever, for example in two ways: firstly, by providing a switch (in addition to that which actuates the signal indicator) which is closed by the dropping of the balance when the money is placed in the apparatus, and which is opened if the returned money lever is actuated, and secondly, by placing an electro-magnet in the speaking circuit in such a manner that so long as said circuit is closed, an armature will be caused to lock the returned money lever against movement.

Assuming for the sake of example that two separate operating devices, namely, handle 26 and button 32, are provided as above mentioned, when the correct amount has been inserted in the apparatus, the balance arm descends and makes contact by depressing the spring blades 15, 16 of the signal switch for the purpose of transmitting a signal to the exchange, for instance by an earth return or third line. In addition to said spring blades, 15, 16, there are provided two other arms 44, 45, one of which, 44, is pivoted in such a manner as to remain in any adjusted position by friction and the other of which 45 is also a spring blade (hereinafter termed resilient arm for clearness of description) and movement of the first mentioned spring blades, 15, 16, by the balance is sufficient to swing the pivoted arm 44 into contact with the resilient arm 45, whereby communication is also established through the speaking circuit if hitherto broken at this point.

When the lever 26 which deposits the money into the cash receptacle has been operated, the balance arm returns to normal position and the spring blades 15, 16, break the signal circuit, but as there is no coöperating spring action between the pivoted and resilient arms 44, 45, the contact in the speaking circuit remains made.

If, on the other hand, the "returned money" button 32 is operated, connection between the pivoted and resilient arms 44, 45 will be broken by the lower end of the lever 33 striking the extension of said pivoted arm 44, and communication can only be reëstablished by making a new payment. The balance arm 12 returns as before to normal after this action, being only held depressed while the payment is in suspense, so that by operating the returned money lever, not only the signal circuit is interrupted, but also the speaking circuit is interrupted.

In the construction just described the two circuits are made by the movement of the balance arm 12. After an ordinary conversation the arm 44 may remain in contact with arm 45 for the reason that the speaking circuit is broken at the usual switch operated by hanging up the receiver.

If the returned money button 32 is also to be locked against movement during conversation on the speaking circuit this is accomplished by inserting an electro-magnet 46 in or across the speaking circuit, the armature 47 of said magnet 46 being mounted on a pivoted lever under the action of a returning spring 48, and so operated by the magnet when the latter is energized that the armature is attracted and enters a slot in said returned money button and locks the latter against movement. The act of hanging up the telephone transmitter causes the speaking circuit to be broken and release of the armature 47 to unlock the button.

In order that contact may be again made for a limited time after the returned money button 32 has been operated, it will be convenient to insert in the speaking circuit a time switch which, when disconnected by a movement of said returned money button, will automatically reëstablish contact after an interval of time. Referring to Fig. 4, 50, 51 are spring blades for forming contact in the speaking circuit. These blades when free are separated, but are pressed into engagement by an arm 52 operated by spring 55.

The arm 52 is mounted in the path of the push-button 32 so that when the latter is operated the arm 52 is pushed away from the blades 50, 51 and the latter separate. The return of the arm 52 to its previous position under action of its spring 55 is controlled by the time train 53 ending in the rotatable brake 54.

What I claim as my invention and desire to secure by Letters Patent of the United States is:—

1. In a coin collector for telephone services the combination of a coin receiving balance, a rocker coöperating therewith, separate calling and speaking circuit contacts, adapted to be closed by the balance under action of a coin thereon, means whereby the calling circuit contacts are separated on return of the balance to normal, a return money device and means whereby the speaking circuit contacts are separated by operation of main return money device.

2. In a coin collector for telephone services the combination of a coin receiving balance, a rocker coöperating therewith, separate calling and speaking circuit contacts adapted to be closed by the balance under action of a coin thereon, means whereby the calling circuit contacts are caused to automatically open on return of said balance to normal and means for causing the speaking circuit contacts to remain closed on the aforesaid return movement of the balance.

3. In a coin collector for telephone services the combination of a coin receiving balance, a rocker coöperating therewith, separate calling and speaking circuit contacts adapted to be closed by the balance under action of a coin thereon, means whereby the calling circuit contacts are caused to automatically open on return of said balance to normal, means for causing the speaking circuit contacts to remain closed on the aforesaid return movement of the balance, a return money operating device and means controlled thereby for re-opening the speaking circuit contacts.

4. In a coin collector for telephone services the combination of a coin receiving balance, a rocker coöperating therewith, separate calling and speaking circuit contacts adapted to be closed by the balance under action of a coin thereon, means whereby the calling circuit contacts are caused to automatically open on return of said balance to normal, means for causing the speaking circuit contacts to remain closed on the aforesaid return movement of the balance, a return money operating device, means controlled thereby for re-opening the speaking circuit contacts and means for closing the speaking circuit contacts after a determined interval of time.

5. In a coin collector for telephone services, the combination of a coin receiving balance, a rocker coöperating therewith, separate calling and speaking circuit contacts adapted to be closed by the balance under action of a coin thereon, means whereby the calling circuit contacts are separated on return of the balance to normal, a return money device, means whereby the speaking circuit contacts are separated by operation of said return money device and means for locking the return money device while the speaking circuit contacts are closed.

6. In a coin collector for telephone services the combination of a coin receiving balance, a rocker coöperating therewith, separate calling and speaking circuit contacts adapted to be closed by the balance under action of a coin thereon, means whereby the calling circuit contacts are separated on return of the balance to normal, a return money device, means whereby the speaking circuit contacts are separated by operation of said return money device and means for locking the return money device while the speaking circuit contacts are closed comprising an electro-magnet in said speaking circuit, the armature of which when attracted locks the said device.

In witness whereof I have signed this specification.

FREDERICK WILLIAM HALL.